(12) United States Patent
Wallace et al.

(10) Patent No.: US 11,457,144 B2
(45) Date of Patent: Sep. 27, 2022

(54) CAMERA MODULE AND MULTI CAMERA SYSTEM FOR HARSH ENVIRONMENTS

(71) Applicant: Rovco Limited, Bristol (GB)

(72) Inventors: Iain Wallace, Bristol (GB); Lyndon Hill, Bristol (GB); Brian Allen, Bristol (GB); Pep Lluis Negre Carrasco, Bristol (GB)

(73) Assignee: Rovco Limited, Bristol (GB)

(*) Notice: Subject to any disclaimer, the term of this patent is extended or adjusted under 35 U.S.C. 154(b) by 0 days.

(21) Appl. No.: 17/273,303

(22) PCT Filed: Jul. 31, 2019

(86) PCT No.: PCT/EP2019/070586
§ 371 (c)(1),
(2) Date: Mar. 3, 2021

(87) PCT Pub. No.: WO2020/048691
PCT Pub. Date: Mar. 12, 2020

(65) Prior Publication Data
US 2021/0235010 A1    Jul. 29, 2021

(30) Foreign Application Priority Data
Sep. 4, 2018    (EP) .................................... 18192388

(51) Int. Cl.
*H04N 7/18*    (2006.01)
*H04N 5/232*    (2006.01)
(Continued)

(52) U.S. Cl.
CPC ....... *H04N 5/23227* (2018.08); *H04N 5/2252* (2013.01); *H04N 5/247* (2013.01); *H04N 2005/2255* (2013.01)

(58) Field of Classification Search
CPC ... A61B 1/00066; A61B 1/0676; A61B 1/042; A61B 1/051; A61B 1/0008;
(Continued)

(56) References Cited

U.S. PATENT DOCUMENTS

| 2016/0261829 | A1* | 9/2016 | Olsson | H04N 5/23293 |
| 2017/0195568 | A1 | 7/2017 | Leizerovich, Jr. | |
| 2018/0370435 | A1* | 12/2018 | Konno | H04N 7/18 |

FOREIGN PATENT DOCUMENTS

| EP | 2502408 B1 | 9/2012 |
| WO | 2016/073980 A1 | 5/2016 |

OTHER PUBLICATIONS

International Search Report and Written Opinion issued in PCT/EP2019/070586 dated Oct. 23, 2019.

* cited by examiner

*Primary Examiner* — Masum Billah
(74) *Attorney, Agent, or Firm* — Potomac Law Group, PLLC; John J. Penny, Jr.

(57) ABSTRACT

A camera module for imaging in harsh environments, the camera module comprising: a casing defining a fluid tight sealed interior space, the casing being arranged to be mounted on a platform; a camera arranged to face outwardly from the casing to capture images; a data processor; an internal data link coupled between the camera and the data processor to transfer image data from the camera to the data processor; and an external data link coupled to the camera or the data processor and being arranged to communicatively couple the camera module to an external computing device distinct from the camera.

20 Claims, 4 Drawing Sheets

(51) Int. Cl.
*H04N 5/225* (2006.01)
*H04N 5/247* (2006.01)

(58) Field of Classification Search
CPC .......................... A61B 1/00096; A61B 1/0011;
H04N 5/2252; H04N 13/25; H04N
13/243; H04N 5/23227; H04N 5/23203;
H04N 5/2257; H04N 5/247; H04N
13/296; H04N 2005/2255
USPC ........................................................... 348/82
See application file for complete search history.

CAMERA MODULE AND MULTI CAMERA SYSTEM FOR HARSH ENVIRONMENTS

Priority is claimed under 35 U.S.C. § 119 to EP Application No. 18192388.9 filed on Sep. 4, 2018 and under 35 U.S.C. § 365 to PCT/EP2019/070586 filed on Jul. 31, 2019.

BACKGROUND

Known multi camera systems have a data processor that communicates with each camera to transfer image data (video or images) as well as perform processing tasks.

If the multi camera system is to produce high quality video, then the data processor must be powerful enough to transfer and process high bandwidth image data of large spatial and colour resolution, colour depth and high framerate.

SUMMARY

In accordance with a first aspect of at least one embodiment of the invention, there is provided a camera module for imaging in harsh environments, the camera module comprising:
  a casing defining a sealed interior space, the casing being arranged to be mounted on a platform;
  a camera arranged to face outwardly from the casing to capture images;
  a data processor;
  an internal data link coupled between the camera and the data processor to transfer image data from the camera to the data processor; and
  an external data link coupled to the camera or the data processor and being arranged to communicatively couple the camera module to an external computing device distinct from the camera.

Thus, a camera module according to some embodiments of the invention is provided with a data processor directly coupled to the camera via an internal data link, which can be a super high bandwidth connection. The external data link enables the camera module to be used as part of a multi camera system in which each camera is provided within a respective casing and is directly coupled to a data processor within the respective casing. This enables rapid data transfer between the camera and data processor of a camera module, which enables the use of cameras with high resolution, colour depth and framerate. These properties respectively allow for fine detail, accurate colour and accurate motion capture, but together require higher bandwidth than would be possible in comparison to a notional system which has multiple cameras in respective casings each coupled to a common data processor, thus requiring the use of high bandwidth data links which extend between casings through the harsh environment. The present inventors have found that such super high bandwidth connections for harsh environments are unreliable, expensive and/or difficult to manufacture. Moreover, the camera and data processor pairs of camera modules according to some embodiments of the invention enable the above-mentioned level of image processing in real-time with less processing power in comparison to the notional system; a powerful data processor is undesirable due to its power requirements and the need to operate in a sealed enclosure where heat cannot easily be dissipated, thus resulting in data being transferred for post processing (i.e. offline processing) rather than processed in real-time.

The camera module can include a synchronisation subsystem coupled to the external data link and arranged to synchronise a system clock of the data processor or the camera to system clocks of one or more further distinct camera modules with an accuracy greater than the inter frame time of the camera or cameras. The data processor can include the synchronisation subsystem.

The internal data link can have a relatively high data transfer rate in comparison to the data transfer rate of one or all channels of the external data link.

The casing can be formed with a cover portion arranged to be removably coupled to a body of the casing to close an opening through the casing in a sealing manner. The seal can define a fluid (i.e. a liquid and/or a gas) tight seal between the interior space and the exterior of the camera module. Alternatively, the casing can be formed around the components from a unitary piece of material such as a composite or polymer material that is cured once the components are within it.

The internal data link can have a data transfer rate suitable for the captured image to be transferred from the camera to the data processor at a rate allowing for smooth video motion, for example at least 20 frames per second. The data transfer rate can for example be at least 1 Gigabit per second.

The camera can comprise a camera processor and the data processor can be distinct from the camera processor. The camera processor can include the synchronisation subsystem.

The data processor can be suitable for computationally complex image processing and computer vision algorithms. For example, the data processor can comprise multiple processing cores including (but not requiring) GPU cores and embedded processing for video codecs or AI operations, such as a NVidia Tegra™ system on a chip (SoC).

The casing can be a pressure vessel configured to withstand pressure differentials between its exterior and interior or filled with a pressure compensating gas or fluid; enabling the camera module to be continuously used in harsh underwater environments, such as in at least two metres of water, or at least five metres of water, or in at least 10 metres of water, and in some cases at least twenty metres of water. In other embodiments the casing can be configured to enable the camera module to be continuously used in other harsh environments such as in a vacuum.

The external data link can comprise a first external data channel coupled to the data processor and being arranged to couple the data processor to an external data processing device.

The external data link can comprise a second external data channel coupled to the camera and being arranged to couple the camera to an external camera device, wherein the first external data channel has a relatively high data transfer rate in comparison to the second external data channel.

The external data link can comprise a third external data channel coupled to the data processor to enable data readout to, or system control from, an external computer client.

The casing can comprise one or more ports, each arranged to pass one or more channels of the external data link from the casing interior to the casing exterior, each port defining a harsh environment connector.

A harsh environment connector can be arranged to enable an external cable to form a communicative part of the second or third data link whilst providing a fluid (i.e. a liquid and/or a gas) tight seal between the interior space and the exterior of the camera module.

The internal data link can comprise a first wired connection and one or more channels of the external data link can comprise wired connections. The axial length of the internal data link wired connection can be relatively short in comparison to the wired connections of the external data link. This can result in a relatively fast data transfer rate between the camera and data processor. The axial length of the internal data link can for example be less than 1 metre, in some embodiments only a few centimetres and not required to pass through the pressure vessel thus allowing very high bandwidth. As such, the internal data link can be entirely contained within the pressure vessel defined by the casing.

One or more channels of the external data link can comprise a wireless communication channel.

The camera module can further comprise a window in the casing via which the camera is arranged to capture images. The window can be formed in part of the casing or the entire casing can be formed from a transparent material that enables the camera to capture images suitable for processing.

In accordance with a further aspect of at least one embodiment of the invention, there is provided a multi camera system for imaging in harsh environments, the multi camera system comprising:
 a first camera module according to the first aspect;
 a second camera module according to the first aspect; and
 a platform upon which the first and second camera modules are mounted,
 wherein the first and second camera modules are communicatively coupled via the external data link and optionally the third data link.

In addition to the benefit of rapid data transfer speeds enabling high video quality due to each camera having a dedicated data processor for primary data processing purposes coupled via a super high bandwidth connector, harsh environment multi camera systems according to some embodiments of the invention have a further advantage of the casing size of the camera modules being independent of the distance between cameras. The inventors have found that it can be difficult to provide a reliable super high bandwidth link between a pair of camera modules across a harsh environment space. Thus, if a pair of spaced high bandwidth cameras are to be coupled to a common data processor then the casing would have to be large enough to accommodate the separation between the cameras. By providing camera modules with dedicated camera and data processor pairs coupled via super high bandwidth internal data links, the casing walls can be made thinner than would be possible when compared to a single casing large enough to house both cameras with the same lateral distance between them. Typically, larger casings require thicker walls to maintain rigidity and resist external high pressure. Thus, smaller casings can require less wall material, resulting in a cheaper and lighter casing. Moreover, a further benefit of harsh environment multi camera systems according to some embodiments of the invention is that there can be less wasted or dead space when compared to a single large casing.

The inventors have also found that multiple data processors in a single system can give rise to efficient distribution of video and image processing. In video or image processing systems there are usually a number of operations that need to be performed per frame or per image such as filtering and contrast equalisation. Similarly, when computer vision systems perform operations such as feature detection, rectification, geometric distortion removal, etc., these are often performed per frame or per image. Therefore, each data processor can perform tasks or processes on the frames or images produced by its respective camera, thus improving processing efficiency. When the frame or image data is pre-processed inside the camera module by the data processor then the important features of the data can be used in computations, reducing the demand for voluminous raw data externally, thus removing the need for the external data link to be super high bandwidth. In comparison to a single, more powerful data processor in a single casing, two data processors in two separate casings can produce less heat per casing. Thus, two casings with two data processors can allow for a simpler/easier cooling system.

The cameras of the first and second camera modules are mounted in a spaced relationship for stereoscopic/3D photogrammetry with a distance of at least 5 cm between them. In other embodiments the cameras can be spaced by at least 10 cm and in some cases at least 15 cm or more. Spacing can refer to the distance between the optical axes of the cameras.

The multi camera system can further comprise a third camera module according to the first aspect, mounted on the platform, wherein the first or second camera module and the third camera module are communicatively coupled via the external data link and optionally the third data link.

The platform can comprise a remotely operable or autonomous mobile platform such as an underwater remotely operable vehicle (ROV), an autonomous underwater vehicle (AUV), an unmanned air vehicle (UAV), an unmanned ground vehicle (UGV), an unmanned underwater vehicle (UUV), or an unmanned surface vehicle (USV).

In one example, the platform can comprise a subsea remotely operable or autonomous vehicle including a propulsion system, a steering system and a command controller arranged to control the propulsion system and the steering system in accordance with command signals provided from a control station which is remote with respect to the vehicle.

The multi camera system can further comprise one or more light sources arranged to illuminate at least parts of the fields of view of the cameras of the camera modules.

At least some embodiments of the invention exhibit one or more of the following advantages relative to known systems:
 improved reliability;
 increased simplicity;
 reduced cost;
 smaller in size; and/or
 reduced weight.

BRIEF DESCRIPTION OF THE DRAWINGS

By way of example only, certain embodiments of the invention will now be described by reference to the accompanying drawings, in which.

DETAILED DESCRIPTION

By way of a non-limiting overview, some embodiments of the invention relate to harsh environment camera modules of a design and architecture suitable for harsh environment multi camera systems capable of performing real-time (live) image processing. The camera of each camera module is directly coupled to a single data processor within its casing via a super high bandwidth link to enable a harsh environment multi camera system that is smaller and/or simpler than known systems having the same quality of cameras and/or image data.

Figure 1:
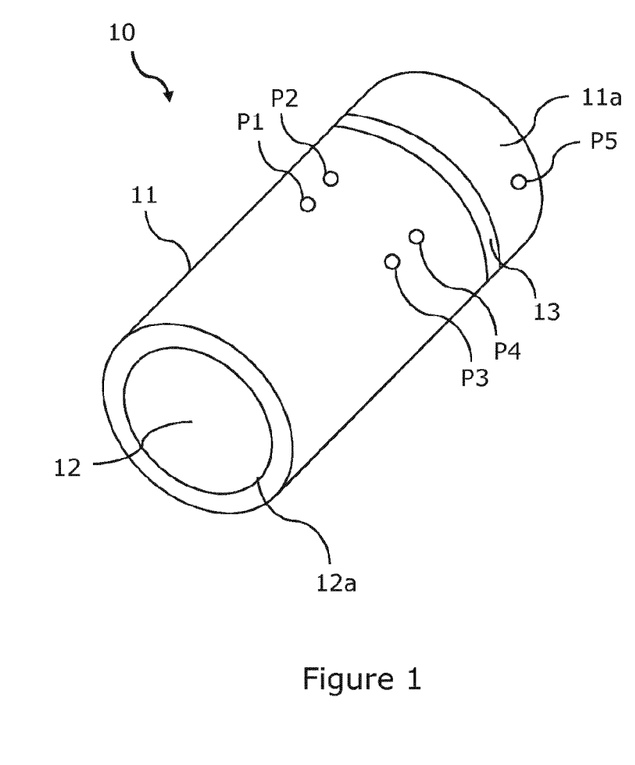
FIG. 1 is a perspective view of a camera module according to an embodiment of the invention.

FIG. 1 shows a harsh environment camera module according to an embodiment of the invention generally at 10. The camera module 10 is arranged for deployment into harsh environments, such as continuous use underwater beyond two metres, subsea, or in the vacuum of space, on a Remotely Operated Vehicle (ROV), Autonomous Underwater Vehicle (AUV), robotic platform or the like.

Harsh environments place stringent requirements on a camera module, such as mechanical stresses, radiative stresses, chemical reactions and temperature exposure. Mechanical stresses can include pressure, shock, vibration, and coefficient of thermal expansion (CTE) mismatches. Radiative stresses can include cosmic rays, and magnetic influences from electromagnetism. Chemicals such as salt water, moisture, fuel and noxious gases can react with such a camera module. Temperatures below −40° C. and/or above 125° C. can also be experienced in a harsh environment.

In the illustrated embodiment the camera module 10 comprises a casing 11 that defines a watertight housing having an interior space. One end of the casing 11 includes a transparent window or lens 12a. A camera 12 is mounted within the interior space and is arranged to capture images of the exterior environment through the window 12a. The interior space of the casing 11 can be accessed by removing a casing end cap 11a which is removably coupled to a body of the casing 11 via an o-ring sealed flange. An optional seal 13 is provided between the casing end cap 11a and the body of the casing to inhibit water ingress.

The casing 11 of this embodiment is formed from stainless steel and is cylindrical in shape so as to be structurally resistant to high pressures which may be experienced by the camera module 10 in an underwater harsh environment such as a deep underwater environment and/or a subsea oil and gas infrastructure site.

In other embodiments the material and/or shape of the casing 11 can be changed depending on the deployment environment, e.g. aluminium, copper beryllium, titanium, plastic, ionomers, PEKK, carbon fibre or ceramics in order to provide stress, chemical and/or temperature resistance. It is preferred that the material and shape of the casing 11 results in a strong and rigid structure. The shape of the casing 11 can be any pressure resistive shape such as a prism or cylinder. The camera 12 can form part of the casing 11 such that the casing 11 forms a fluid seal with at least part of the camera 12 (e.g. the lens of the camera 12). Other end cap seals can be formed using methods including throughbolts or a threaded tube.

The casing 11 has a plurality of ports P1-P5 on the outside that enable wired connections to be made between internal equipment located in the interior space and equipment located outside of the casing 11. In the illustrated embodiment there are five ports P1-P5 but in other embodiments there can be fewer or more ports and in some cases there are no ports.

The casing 11 can be arranged to protect the equipment within it from rapid accelerations and decelerations as may be experienced during harsh environments. Thus, in the illustrated embodiment the inner structure is arranged to cradle the internal equipment in a secure manner; for example, interior surfaces of the casing 11 can be provided with ribs or other mounting structures to which components of the equipment can be mounted. The interior space can be provided with cushioning elements such as styrene polymer shielding elements that can conform to inner surfaces of the casing and outer surfaces of the components to cradle and protect them. Furthermore, the internal construction can be designed with heatsinks and fans to efficiently transfer excess heat into the casing and dissipate it externally.

Figure 2:
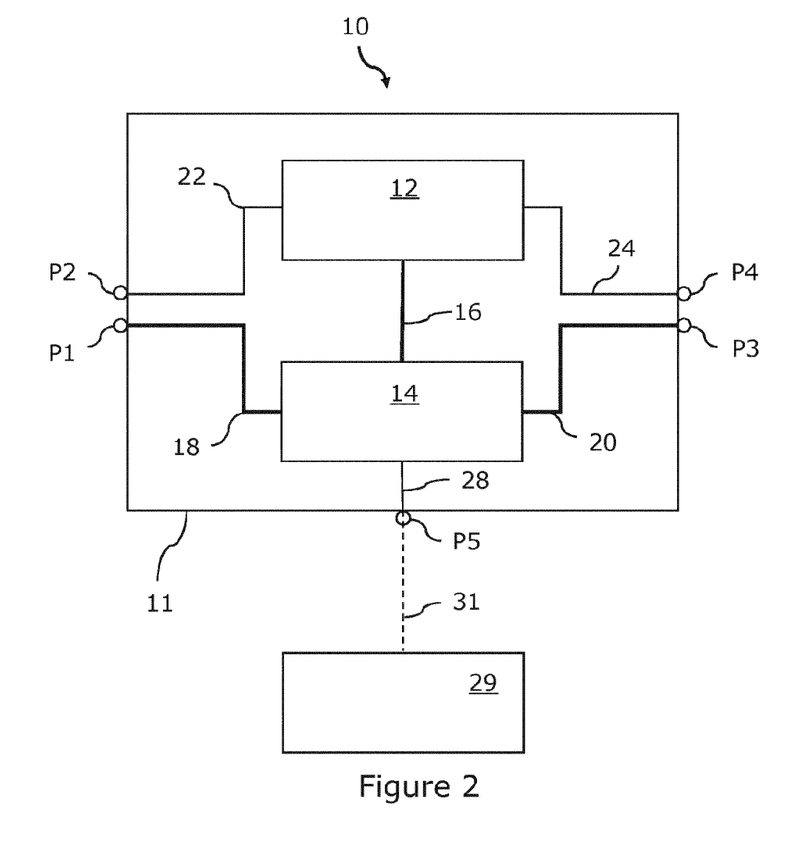
FIG. 2 is a system diagram of the camera module of FIG. 1.

FIG. 2 is a system diagram of the camera module 10 of FIG. 1, illustrating the internal equipment. The camera module 10 comprises the camera 12, a data processor 14, a super high bandwidth internal data link 16 and an external data link which in this embodiment comprises high bandwidth first channels 18, 20, standard bandwidth second channels 22, 24 and a third channel 28, all housed within the interior space of the casing 11.

The camera 12 is arranged to enable high quality images/videos to be taken which can be used to map the environment outside of the camera module 10. The images and/or video can be used to identify objects and can be used for navigation. In this embodiment the camera 12 is an application specific camera, such as a FLIR Grasshopper 3™ arranged to capture high definition images and/or video. The camera 12 has an internal processor (not shown) to perform tasks such as setting camera parameters, synchronisation, file management, white balance and basic colour processing. Alternatively, the camera could be any other camera capable of capturing high definition images or video, for example, 1080P (1,920×1,080 pixels), 4K (3,840×2,160), 8K (8,192×4,320) or more at 20 frames per second (FPS) or higher.

The data processor 14 can have a processor (not shown), network interface (not shown), and volatile and non-volatile memory (not shown). The memory can store images, video, or metadata. The data processor 14 is distinct from the processor (not shown) of the camera 12.

The data processor 14 is configured to process images and/or video supplied to it from the camera 12 in real-time. Thus, the data processor 14 is sufficiently powerful to perform this function. The data processor 14 is configured in this embodiment to perform computationally demanding image processing and computer vision algorithms. For example, the data processor 14 can perform tasks on the frames and/or images produced by camera 12 such as feature detection, computing feature descriptors, matching features, rectifying the image, computing multiscale versions of the same image, or compressing and storing.

For real-time applications the data processor 14 is typically required to be synchronised to the frames of the camera 12. This leads to regular periods of time within which processing must take place. For example, for a 30 FPS camera, the data processor will only have 33.3 ms to process the frame before the next frame is required to be processed. Moreover, higher quality images will take longer to process than lower quality images on the same data processor. For example, if processing cannot be achieved in the 33.3 ms for a 30 FPS camera, then the frame quality or FPS will have to be reduced. Thus, the useful output image/video quality of the camera 12 is limited by the processing power of the data processor 14. Thus, the data processor 14 has sufficient memory for caching multiple frames and enough power to perform non-trivial image processing operations.

In view of the above, camera modules according to an embodiment of the invention are arranged such that the camera 12 communicates with the data processor 14 via the super high bandwidth internal data link 16, for transferring captured images or videos from the camera 12 to the data processor 14. In the illustrated embodiment the internal data link 16 is USB 3 with a bandwidth of 5 Gigabits per second and the data processor comprises four ARM Cortex™ A57

64 bit cores and dedicated video encoding hardware. In other embodiments, the internal data link 16 can be any other high speed cable technology that meets the minimum bandwidth link requirements for a given application.

The high bandwidth first channels 18, 20 of the external data link can be provided to allow the data processor 14 to communicate and share data between other data processors (not shown). The first channels 18, 20 terminate at ports P1, P3 respectively. The first channels 18, 20 enable sharing of images or video frames and other processed data which do not require the same transfer speed as that provided by the super high bandwidth internal data link 16. In the illustrated embodiment the first channels 18, 20 are twisted pair with a bandwidth of 100 Megabits per second. In other embodiments the first channels 18, 20 can be any other high speed cable technology. In some embodiments the data processor 14 is not arranged to synchronise with data processors of other camera modules.

The camera 12 can be arranged to synchronise image capture with other cameras (not shown) via the standard bandwidth second channels 22, 24 of the external data link. The second channels 22, 24 terminate at ports P2, P4 respectively. In the illustrated embodiment the second channels 22, 24 are coaxial cables with a bandwidth of 30 Hz. The second channels 22, 24 can be used to synchronise other cameras (not shown) to the camera 12 in real-time. Thus, the bandwidth of the second channels 22, 24 only needs to be specified to a carry a simple but time stringent hardware synchronisation signal and exchange of timing metadata to ensure accurate matching of synchronised frames. In other embodiments the second channels 22, 24 can be any other high speed cable technology. In some embodiments the camera 12 is not arranged to synchronise with cameras of other camera modules.

Processed data from the data processor 14 can be output via the third channel 28 of the external data link, which communicates with the fifth port P5. A transfer cable 31 can be coupled to the fifth port P5 in order to transfer data from the data processor 14 to an external computer client 29. The third channel 28 can be any type of bandwidth link. The external computer client 29 (e.g. data consumer) is an external computer which is external to the hardware of camera module 10. The external computer client 29 can perform additional processing, for example rendering alternative visualisations of the 3D data, or computing navigation data. In other embodiments the output link 28 can be a wireless communications link, or a bidirectional link allowing for camera system control by the external computer client.

In alternative embodiments pairs of channels (e.g. 20, 24) can share a single port and in some cases all channels (e.g. 18, 20, 22, 24, and/or 28) can share a single port.

Some or all of the ports P1-P5 can define harsh environment connectors arranged to connect the respective links to external links. The harsh environment connectors can be dry or wet mate, rubber moulded, glass reinforced or metal shell connectors. The connectors can be a type of keyed connector, plug and socket connector, or any other type of connector with or without a locking mechanism. In other embodiments the links pass through the port such that camera modules are connected by continuous cables.

Figure 3:
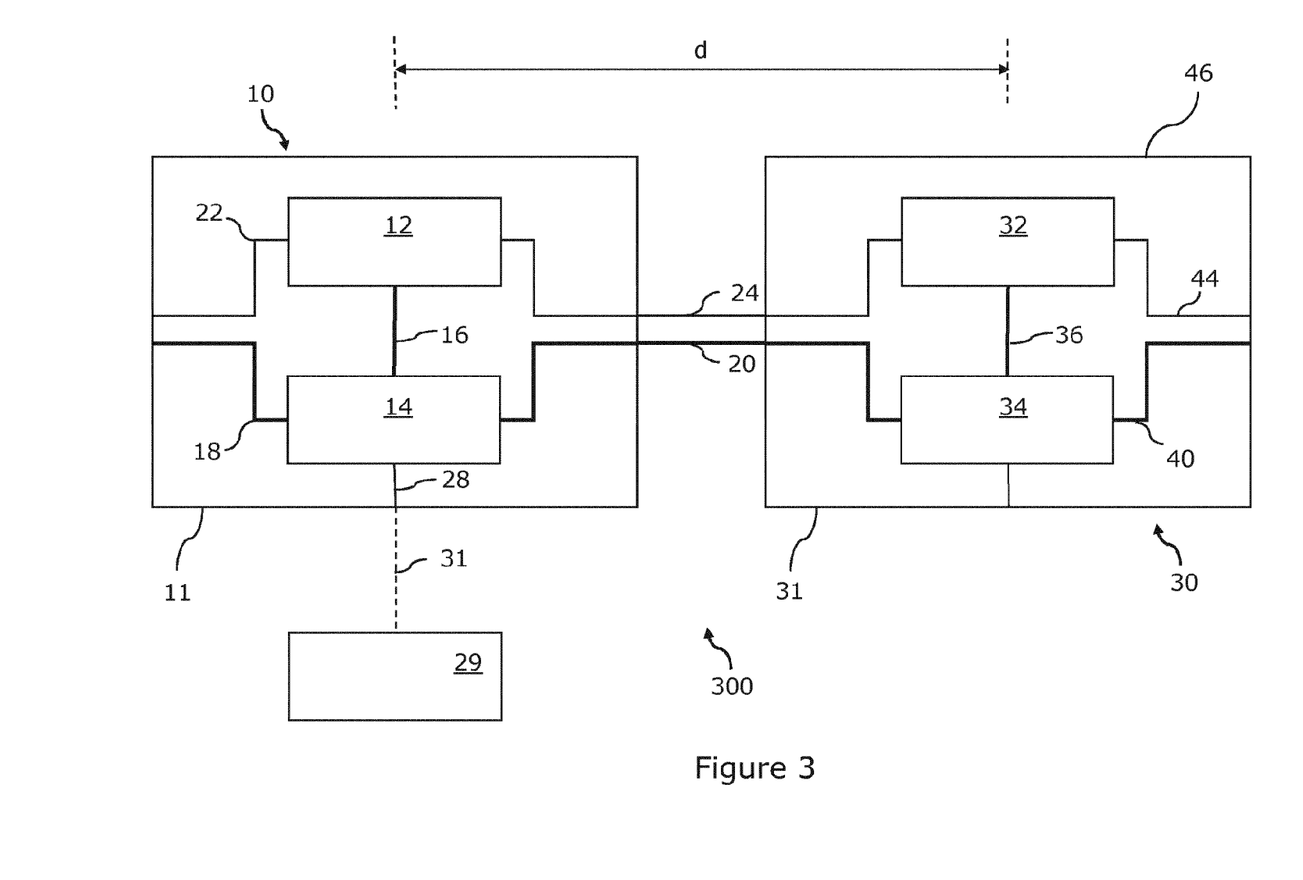
FIG. 3 is a system diagram of a multiple camera system according to an embodiment of the invention, formed from two camera modules.

FIG. 3 is a diagram of a harsh environment multi camera system 300 according to an embodiment of the invention. The multi camera system 300 comprises a pair of camera modules 10, 30 arranged in a stereoscopic configuration.

The first camera module 10 is identical to the camera module 10 of FIGS. 1 and 2. The second camera module 30 is arranged to be identical in hardware to the camera module 10 of FIGS. 1 and 2, however, can differ in software and/or firmware. Camera modules (e.g. 10) identical in hardware can be more flexible and adaptable; for example, either camera module could be replaced by a spare camera module.

The first and second camera modules 10, 30 are mounted on a platform (not shown) such as a rigid frame arranged to be removably coupled to an ROV or other vehicle or assembly. In some embodiments the camera modules can be arranged to be directly mounted on a vehicle. The camera modules can include mounting formations such as brackets which do not form part of the interior chamber arranged to facilitate mounting.

The first and second camera modules 10, 30 are mounted in a known spatial relationship such that the lateral distance d between them is known. In this embodiment the lateral distance d between them is 15 cm. Alternatively, the cameras 12, 32 can be any distance away from each other as long as the cameras 12, 32 observe an overlapping observation area. The optical axes of the first and second camera modules 10, 30 can be aligned in a parallel manner, but this does not need to be the case.

The software and/or firmware of the camera modules 10, 30 can be computationally optimised based on their position relative to each other. Thus, more accurate results can be obtained after modifying the relative position of the cameras without needing to modify the internal hardware of the system or open the enclosures.

The software and/or firmware of the camera modules 10, 30 can be arranged so that the system can be easily configured to work on specific applications. For example, if the (identical) cameras have different operating modes it is possible to change the configuration so that one camera in a stereo pair captures at one frame rate and the other captures images at a higher frame rate, thus allowing higher temporal resolution while simultaneously capturing stereo frame pairs.

The software and/or firmware of the camera modules 10, 30 can be arranged to allow for redundancy; for example, if one part of a camera module such as the data processor fails, the other camera module can take over the processing of the failed camera module. However, in this condition the system would not perform as well as a fully functioning system.

The stereoscopic configuration of FIG. 3 can be used for stereoscopic photogrammetry. When the working distance of a stereo camera system to the scene of interest increases it may be desirable to increase the camera separation to preserve voxel resolution. For systems with both cameras in a single enclosure the required separation could easily make the size of the enclosure inconveniently large, therefore requiring thicker walls, as the cylinder volume is dependent on the square of the radius.

In addition to the benefit of rapid data transfer speeds enabling high video quality due to the cameras 12, 32 each having a dedicated data processor 14, 34 coupled via a super high bandwidth connector 16, 35, harsh environment multi camera systems according to some embodiments of the invention have a further advantage in that the casing size of each of the camera modules 10, 30 is independent of the distance d between cameras 12, 32. The inventors have found that it can be difficult to provide a super high bandwidth link across a harsh environment space between a pair of camera modules. Thus, if a pair of spaced cameras are to be coupled to a common data processor then the casing would have to be large enough to accommodate the separation between the cameras. By providing camera modules with dedicated camera and data processor pairs coupled via super high bandwidth internal data links, the casing walls can be made thinner than would be possible when compared to a single casing that is large enough to house both cameras with the same lateral distance d between them. Typically, larger casings require thicker walls to maintain rigidity and resist external high pressure. Thus, smaller casings can require less wall material, resulting in a cheaper and lighter casing. Moreover, a further benefit of harsh environment multi camera systems according to embodiments is that there can be less wasted or dead space when compared to a single large casing.

In FIG. 3, the identical camera modules 10, 30 can be arranged in a master-slave configuration, such that camera 12 and data processor 14 are programmed (via software and/or firmware) to be the master camera and master data processor respectively without requiring physical changes. Thus, the data processor 14 or camera 12 is arranged to act as synchronisation subsystem arranged to synchronise a system clock of the data processor 14 or the camera 12 to system clocks of one or more further distinct camera modules, preferably with an accuracy greater than the inter frame time of the camera or cameras. The master camera 12 can generate a hardware synchronisation signal that travels along the standard bandwidth second channel 24, which connects cameras 12, 32. The hardware synchronisation signal can ensure that the camera 12, 32 shutters are synchronised. Synchronised camera shutters ensure that the two cameras 12, 32 start capturing an image/frame at substantially the same time, such that any differences in the two images/frames is due to camera position, and not due to movement of the platform, or movement of the subject of the images/frames. Moreover, the hardware synchronisation signal can be used to synchronise exposure timing differences. Synchronised images/frames can lead to more accurate stereoscopic photogrammetry for live processing, in addition to offline processing. Using the Network Time Protocol (NTP) for example, one data processor can keep other processors in synchronisation to a tolerance below individual camera frame times.

Images and/or frames captured from a synchronised camera 12, 32 shutter can also include metadata describing the internal timestamp of the camera 12, 32, such that precise synchronisation can be confirmed and unmatched images and/or frames can be ignored. Thus, if images arrive at their destination data processor (not necessarily the closest processor) out of sequence order then they can be reordered into the correct sequence.

In other embodiments, post processing can be used to correct and use images/frames from unsynchronised cameras. Unsynchronised cameras do not require the standard bandwidth second channels 22, 24, 44.

The data processors 14, 34 can also or alternatively be arranged to be globally synced, such that their internal chronometers (not shown) reference the same base time.

The inventors have also found that multiple data processors 14, 34 in a single system can give rise to efficient distribution of video and/or image processing. In video and/or image processing systems there are usually a number of operations that need to be performed per frame and/or per image such as filtering and contrast equalisation. Similarly, computer vision systems perform operations such as feature detection, rectification, geometric distortion removal, etc., which are often performed per frame and/or per image. Therefore, each data processor 14, 34 can perform tasks/ processes (mentioned above) on the frames and/or images produced by its respective camera 12, 32, thus improving processing efficiency. In comparison to a single, more powerful data processor in a single casing, two data processors 14, 34 in two separate casings 11, 46 can produce less heat per casing. Thus, two casings with two data processors 14, 34 can allow for a simpler/easier cooling system.

A slave data processor e.g. 34 can perform tasks delegated to it by the master data processor 14, such as matching features or compressing and storing views from cameras 12, 32 of the stereoscopic video or images.

The data processors 14, 34 in the illustrated embodiment can be configured to collaboratively work on single images, calculate rectified views, compute pixel disparities, render novel 3D views, generate 3D point clouds, compress stereoscopic video and/or images, or any mixture of the above tasks as is afforded by the design of the system.

Processed data from the data processors 14, 34 can also be output via the third channel 28 of the external data link to an external computer client 29. Each data processor 14, 34 can be connected to an external computer client (e.g. 29, other clients not shown) to perform additional processing or consume data.

Figure 4:
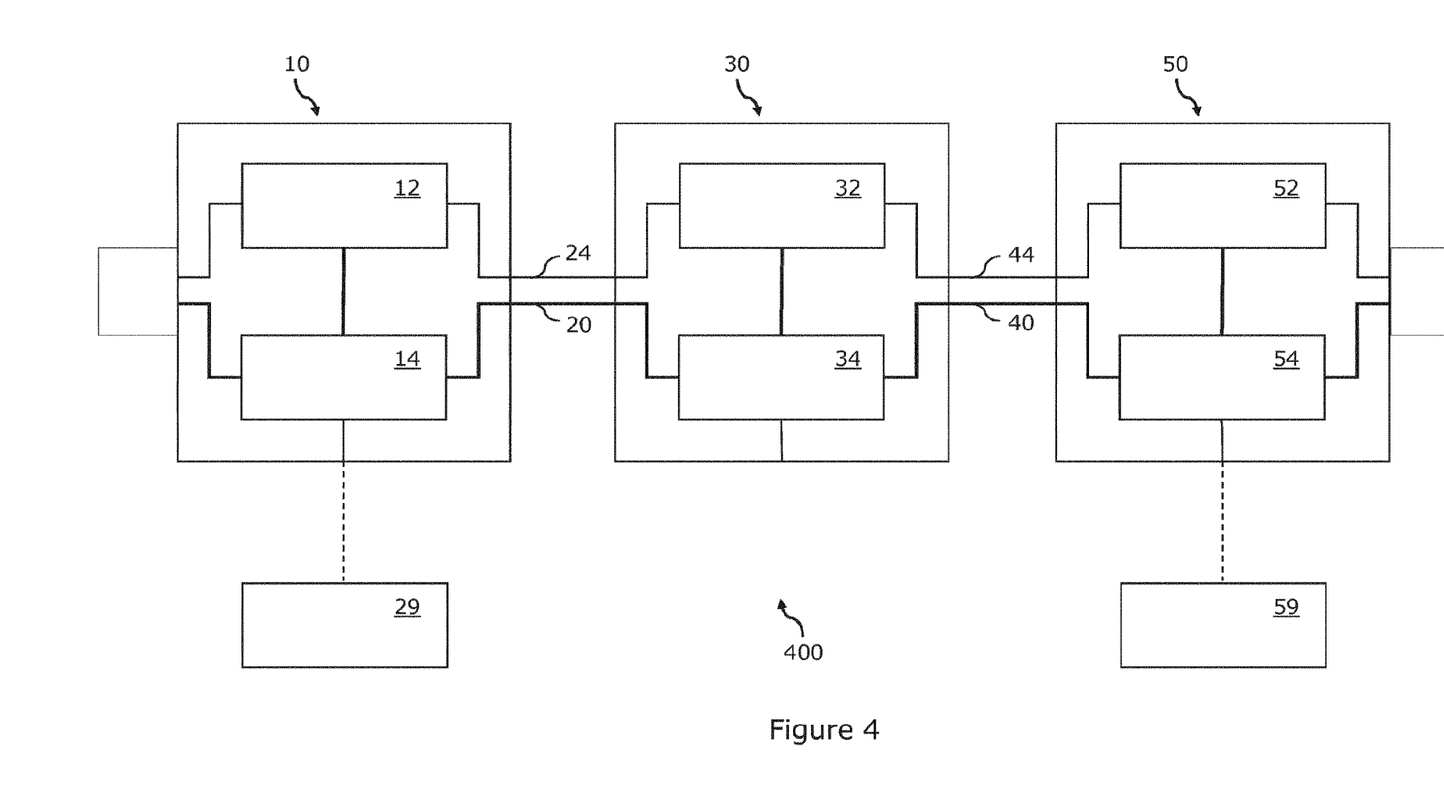
FIG. 4 is a system diagram of a multiple camera system according to an embodiment of the invention, formed from three camera modules.

FIG. 4 is a diagram of a harsh environment multi camera system 400 according to a further embodiment of the invention. The multi camera system 400 of this embodiment comprises three camera modules 10, 30, 50, arranged in a trinocular configuration. This system has all the benefits of the previous embodiments. In practice, multi camera system 400 can work with any number of camera modules. Additional camera modules can be connected to the system by the external data link channels (e.g. 20, 24, 40, and 44).

Extending the previous embodiments to a trinocular configuration or a system with more cameras (not shown) only requires a different platform (not shown) and/or changing the software and/or firmware configuration, since all camera modules are arranged to be identical in hardware; i.e. camera module 50 has a camera 52 which is of the same type as the cameras 12 and 32, and camera module 50 has a data processor which is of the same type as the data processors 14 and 34.

The platform (not shown) can be arranged to maintain each camera module 10, 30, 50 at a constant distance d from each adjacent camera module in converging, overlapped or other configuration. In other embodiments the camera modules can be arranged by the platform to be spaced equally along a straight line of length(x−1)×d (where x is the number of camera modules in the system). In other embodiments the camera modules can be arranged by the platform to be different distances away from each other in either a 2D plane or a 3D plane. In some or all of these embodiments the camera module can be arranged such that there can be an overlap in some or all of the cameras' fields of view (an overlapping field of view is desirable for stereoscopic photogrammetry).

The multicamera system 400 can enable omnidirectional video, panoramic wide angle content, or multiple angles of a live event e.g. sports, a music concert, rocket launch, etc. where frame accurate syncing is required, such as photo finish timing, multiple view geometry reconstruction, video editing or evidential image gathering. A multicamera system such as 400 with many cameras also enables omnidirectional video as required for the perception system of an autonomous vehicle for harsh environments, where expanded perception is preferable to requiring platform motion to capture different views.

In any embodiment an external computer client 29 can perform additional processing such as object detection, alternative 3D reconstruction algorithms, denoising, video enhancement, etc. and can generate a visualisation. A thin client 59 can also be connected to camera module 50 to display an alternative visualisation to external computer client 29. The thin client 59 is a computer that has been optimized for establishing a remote connection with a server-based computing environment. The server (not shown) performs most of the processing, which can include launching software programs, general purpose computing, and/or storing data. Extra clients (not shown) can be connected to any previous embodiment to perform additional computation, visualisation, archiving, etc. These extra clients (not shown), external computer client 29, and/or thin client 59 can be based in different geographical locations.

The camera modules of any embodiment can make it easier for thin clients (e.g. 59) to visualise the data being produced as the processing required for visualisation can be performed on any spare computational capacity in the system or on the client itself.

A further benefit of camera modules of any embodiment is that having hardware-identical camera modules (e.g. 10) makes production cheaper and easier. Moreover, faulty camera modules (e.g. 10) are simpler to replace: a faulty camera module (e.g. 10) can replace any other camera module (e.g. 30) by changing the software and/or firmware configuration. Additionally, it is not necessary to open a sealed enclosure to make changes to the configuration of a camera module where a different system configuration is desired.

It should be noted that the above-mentioned embodiments illustrate rather than limit the invention, and that those skilled in the art will be capable of designing many alternative embodiments without departing from the scope of the invention as defined by the appended claims.

The invention claimed is:

1. A camera module for imaging in harsh environments, the camera module comprising:
    a casing defining a fluid tight sealed interior space, the casing being arranged to be mounted on a platform;
    a camera arranged to face outwardly from the casing to capture images;
    a data processor;
    an internal data link coupled between the camera and the data processor to transfer image data from the camera to the data processor; and
    an external data link coupled to the camera or the data processor and being arranged to communicatively couple the camera module to an external computing device distinct from the camera, wherein the external data link comprises a first external data channel coupled to the data processor and being arranged to couple the data processor to an external data processing device, and a second external data channel coupled to the camera and being arranged to couple the camera to an external camera device, wherein the first external data channel has a relatively high data transfer rate in comparison to the data transfer rate of the second external data channel;
    wherein the camera module includes a synchronisation subsystem coupled to the external data link and arranged to synchronise a system clock of the data processor or the camera to system clocks of one or more further distinct camera modules with an accuracy greater than the inter frame time of the camera or cameras.

2. The camera module of claim 1, wherein the internal data link has a relatively high data transfer rate in comparison to the data transfer rate of the external data link.

3. The camera module of claim 1, wherein the camera comprises a camera processor and the data processor is distinct from the camera processor.

4. The camera module of claim 3, wherein the data processor is configured to perform image processing and computer vision algorithms, and the camera processor is configured to perform at least one of: setting camera parameters, synchronisation, file management, white balance or basic colour processing.

5. The camera module of claim 1, wherein the data processor is suitable for performing image processing and computer vision algorithms.

6. The camera module of claim 1, wherein the casing comprises a pressure vessel configured such that the module can withstand continuous use in a vacuum and/or beyond two metres underwater.

7. The camera module of claim 1, wherein the external data link comprises a third external data channel coupled to the data processor to enable data readout to, or system control from, an external computer client.

8. The camera module of claim 1, wherein the casing comprises one or more ports each arranged to pass one or more channels of the external data link from the casing interior to the casing exterior, each port defining a harsh environment connector.

9. The camera module of claim 1, further comprising a window in the casing via which the camera is arranged to capture images.

10. The camera module of claim 1, wherein the further distinct camera module comprises a further casing defining a further fluid tight sealed interior space and a further camera arranged to face outwardly from the further casing to capture further images.

11. The camera module of claim 1, wherein the external data link is arranged to transmit synchronisation signals of the synchronisation subsystem to synchronise the system clock of the data processor or the camera, to system clocks of the one or more further camera modules.

12. The camera module of claim 1, wherein the second external data channel is arranged to communicate a synchronisation signal and the first and second external data channels can operate simultaneously.

13. The camera module of claim 1, wherein the external data link is a wired connection.

14. A multi camera system for imaging in harsh environments, the multi camera system comprising:
    a first camera module;
    a second camera module; and
    a platform upon which the first and second camera modules are mounted,
    wherein the first and second camera modules are communicatively coupled via the external data link,
    the first camera module and the second camera module each comprising:
        a casing defining a fluid tight sealed interior space, the casing being arranged to be mounted on a platform;
        a camera arranged to face outwardly from the casing to capture images;
        a data processor;
        an internal data link coupled between the camera and the data processor to transfer image data from the camera to the data processor; and
        an external data link coupled to the camera or the data processor and being arranged to communicatively couple the camera module to an external computing device distinct from the camera, wherein the external data link comprises a first external data channel coupled to the data processor and being arranged to couple the data processor to an external data processing device, and a second external data channel coupled to the camera and being arranged to couple the camera to an external camera device, wherein the first external data channel has a relatively high data transfer rate in comparison to the data transfer rate of the second external data channel;

wherein the camera module includes a synchronisation subsystem coupled to the external data link and arranged to synchronise a system clock of the data processor or the camera to system clocks of one or more further distinct camera modules with an accuracy greater than the inter frame time of the camera or cameras.

15. The multi camera system according to claim 14, wherein the cameras of the first and second camera modules are mounted in a spaced relationship with overlapping fields of view for stereoscopic imaging with a distance of at least 5 cm between them.

16. The multi camera system according claim 14, further comprising one or more additional camera modules according to any preceding claim mounted on the platform, wherein the first or second camera modules and each additional camera modules are communicatively coupled via an external data link.

17. The multi camera system according to claim 14, further comprising one or more light sources arranged to illuminate at least parts of the fields of view of the cameras of the camera modules.

18. The multi camera system according to claim 14, wherein the platform comprises a vehicle.

19. A camera module for imaging in harsh environments, the camera module comprising:
- a casing defining a fluid tight sealed interior space, the casing being arranged to be mounted on a platform, wherein the casing comprises a pressure vessel configured such that the module can withstand continuous use in a vacuum and/or beyond two metres underwater;
- a camera arranged to face outwardly from the casing to capture images;
- a data processor;
- an internal data link coupled between the camera and the data processor to transfer image data from the camera to the data processor; and
- an external data link coupled to the camera or the data processor and being arranged to communicatively couple the camera module to an external computing device distinct from the camera;
- wherein the camera module includes a synchronisation subsystem coupled to the external data link and arranged to synchronise a system clock of the data processor or the camera to system clocks of one or more further distinct camera modules with an accuracy greater than the inter frame time of the camera or cameras.

20. A multi camera system for imaging in harsh environments, the multi camera system comprising:
- a first camera module;
- a second camera module; and
- a platform upon which the first and second camera modules are mounted,
- wherein the first and second camera modules are communicatively coupled via the external data link,
- the first camera module and the second camera module each comprising:
  - a casing defining a fluid tight sealed interior space, the casing being arranged to be mounted on a platform, wherein the casing comprises a pressure vessel configured such that the module can withstand continuous use in a vacuum and/or beyond two metres;
  - a camera arranged to face outwardly from the casing to capture images;
  - a data processor;
  - an internal data link coupled between the camera and the data processor to transfer image data from the camera to the data processor; and
  - an external data link coupled to the camera or the data processor and being arranged to communicatively couple the camera module to an external computing device distinct from the camera;
  - wherein the camera module includes a synchronisation subsystem coupled to the external data link and arranged to synchronise a system clock of the data processor or the camera to system clocks of one or more further distinct camera modules with an accuracy greater than the inter frame time of the camera or cameras.

* * * * *